United States Patent
Saito

(10) Patent No.: US 11,449,282 B2
(45) Date of Patent: Sep. 20, 2022

(54) CONTROL DEVICE CONFIGURED TO CAUSE PRINT EXECUTING UNIT TO PRINT AND NON-TRANSITORY COMPUTER-READABLE RECORDING MEDIUM STORING COMPUTER READABLE INSTRUCTIONS FOR CONTROL DEVICE

(71) Applicant: BROTHER KOGYO KABUSHIKI KAISHA, Nagoya (JP)

(72) Inventor: Ken Saito, Tokoname (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/476,554

(22) Filed: Sep. 16, 2021

(65) Prior Publication Data

US 2022/0083289 A1   Mar. 17, 2022

(30) Foreign Application Priority Data

Sep. 17, 2020  (JP) .............................. JP2020-156275

(51) Int. Cl.
*G06F 3/12* (2006.01)

(52) U.S. Cl.
CPC .......... *G06F 3/1206* (2013.01); *G06F 3/1236* (2013.01); *G06F 3/1246* (2013.01); *G06F 3/1252* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 7,136,180 B2 * | 11/2006 | Utsunomiya | G06K 15/00 358/1.15 |
| 7,283,272 B2 * | 10/2007 | Johnson | H04N 1/00244 700/24 |
| 8,073,822 B2 * | 12/2011 | Sell | H04L 51/08 707/692 |
| 8,237,966 B2 * | 8/2012 | Honda | H04N 1/00965 358/1.15 |
| 8,964,218 B2 * | 2/2015 | Oshima | G06F 3/1247 358/1.15 |
| 2012/0194864 A1 | 8/2012 | Oshima et al. | |
| 2015/0124293 A1 | 5/2015 | Oshima et al. | |
| 2017/0024172 A1 | 1/2017 | Oshima et al. | |

FOREIGN PATENT DOCUMENTS

JP    2012-159914 A    8/2012

* cited by examiner

*Primary Examiner* — Paul F Payer
(74) *Attorney, Agent, or Firm* — Scully, Scott, Murphy & Presser, PC

(57) ABSTRACT

A control device receives an email including a header part and a body part. A first file image represented by a first file is inserted in the body part. In a case where the body part includes a text different from the first file image, the control device supplies first print data for printing a first print image on a first print medium to the print executing unit. The first print image includes the text, the first file image, and header information which is at least a part of information included in the header part. In a case where the body part does not include the text, the control device supplies second print data for printing a second print image on a second print medium to the print executing unit. The second print image includes the file image but does not include the header information.

11 Claims, 8 Drawing Sheets

FIG. 6

| Body Print Setting = Enabled | | | |
|---|---|---|---|
| Body File | Body Text | Attached File | Print Result |
| X (JPEG) | YES (AAA) | Z | [P1: X with Header Information AAA] [P2: Z] |
| | NO | Z | [P3: X] [P4: Z] |
| Y (PDF) | YES (AAA) | Z | [P5/P6: Header Information AAA, Y] [P7: Z] |
| | NO | Z | [P8: Y] [P9: Z] |

FIG. 7

| Body Print Setting = Enabled ||| Print Result |
|---|---|---|---|
| Body File | Body Text | Attached File | |
| X1 (JPEG) | YES (AAA) | Z | Header Information AAA / X1 / X2 (P11)  Z (P12) |
| X2 (JPEG) | NO | Z (P13) | X1  X2 (P14)  Z (P15) |
| X (JPEG) | YES (AAA) | Z (P21) | Header Information AAA / X (P22)  Y  Z (P23) |
| Y (PDF) | NO | Z (P24) | X  Y (P25)  Z (P26) |

FIG. 8

| Body Print Setting = Disabled | | | Print Result | |
|---|---|---|---|---|
| Body File | Body Text | Attached File | | |
| X (JPEG) | YES (AAA) | Z | Z (P31) | |
| | NO | Z | X (P32) | Z (P33) |
| Y (PDF) | YES (AAA) | Z | Y (P34) | Z (P35) |
| | NO | Z | Y (P36) | Z (P37) |

CONTROL DEVICE CONFIGURED TO CAUSE PRINT EXECUTING UNIT TO PRINT AND NON-TRANSITORY COMPUTER-READABLE RECORDING MEDIUM STORING COMPUTER READABLE INSTRUCTIONS FOR CONTROL DEVICE

CROSS-REFERENCE TO RELATED APPLICATION

This application claims priority to Japanese Patent Application No. 2020-156275, filed on Sep. 17, 2020, the entire contents of which are incorporated herein by reference.

TECHNICAL FIELD

The description herein discloses a control device configured to cause a print executing unit to print an image represented by a file included in an email.

BACKGROUND

A system including a guest terminal, a printer, and a server is known. The guest terminal is configured to send an email including an attached file to the server. The server is configured to generate print data with a body of the email and the attached file as print targets and send this print data to the printer.

SUMMARY

In the above technique, no consideration is given to an email including a body in which an image is inserted. The description herein provides an art configured to suitably execute printing related to an email including a body part in which an image is inserted.

A control device configured to cause a print executing unit to print is disclosed herein. The control device may include a controller. The controller may be configured to: receive an email including a header part and a body part, wherein a first file image represented by a first file is inserted in the body part; in a case where the body part includes a text different from the first file image, supply first print data for printing a first print image on a first print medium to the print executing unit, wherein the first print image includes the text, the first file image, and header information which is at least a part of information included in the header part; and in a case where the body part does not include the text different from the first file image, supply second print data for printing a second print image on a second print medium to the print executing unit, wherein the second print image includes the first file image but does not include the header information.

A computer program, a non-transitory computer-readable recording medium storing computer readable instructions for the control device, and a method executed by the control device are also novel and useful.

BRIEF DESCRIPTION OF DRAWINGS

FIG. 6 shows a print result of a case in which a body print setting is enabled;
FIG. 7 shows a print result of a case in which the body print setting is enabled;
and
FIG. 8 shows a print result of a case in which the body print setting is disabled.

Figure 1:
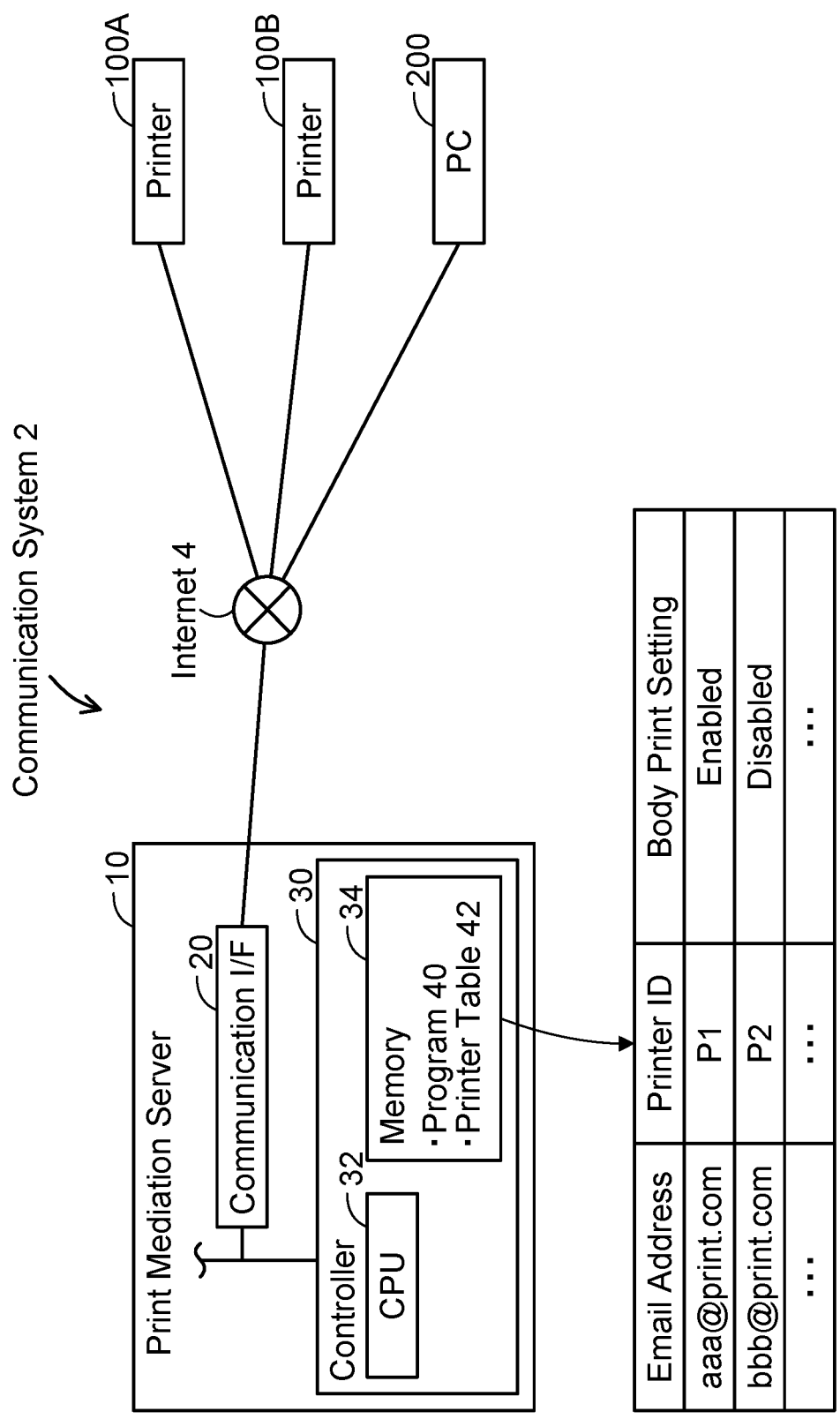
FIG. 1 shows a configuration of a communication system.

DETAILED DESCRIPTION (Configuration of Communication System 2: FIG. 1)

As shown in FIG. 1, a communication system 2 includes a print mediation server 10, a plurality of printers 100A, 100B, and a PC 200. Each of these devices 10, 100A, etc. is connected to the Internet 4 and is configured to communicate with each other via the Internet 4.

The printer 100A and the printer 100B respectively have identification information, printer IDs "P1", "P2", for identifying the printers. The PC 200 is a user terminal for causing the printers 100A, 100B to print.

(Configuration of Print Mediation Server 10)

The print mediation server 10 is installed on the Internet 4 by a vendor of the printer 100A for example. However in a variant, the print mediation server 10 may be installed by a business entity different from the vendor. The print mediation server 10 is configured to mediate communication for the PC 200 to cause the printers 100A, 100B to print. Especially, the print mediation server 10 has an email print function. The email print function is for receiving an email from the PC 200 and causing one of the printers 100A, 100B to print an image represented by a file included in this email. Hereinbelow, the print mediation server 10 will be denoted short as "mediation server 10".

The mediation server 10 includes a communication interface 20 and a controller 30. The communication interface 20 is connected to the Internet 4. The controller 30 includes a CPU 32 and a memory 34. The CPU 32 is configured to execute various processes according to a program 40 stored in the memory 34. The memory 34 is constituted of a volatile memory and a nonvolatile memory, and stores a printer table 42 in addition to the aforementioned program 40.

The printer table 42 stores an email address, a printer ID, and a body print setting in association with each other. For example, an email address "aaa@print.com" and a printer ID "P1" of the printer 100A are associated therein. This means that when the mediation server 10 receives an email having the email address "aaa@print.com" as a recipient, it causes the printer 100A to print an image represented by a file included in this email. The body print setting indicates a value indicating one of "(body print:) enabled", indicating that a text written in a body part of an email is to be printed, and "(body print:) disabled", indicating that the text written in the body part of the email is not to be printed.

The email address and the printer ID in the printer table 42 are information stored when various types of communication are executed between the mediation server 10, the printer 100A (or 100B), and the PC 200. When a user of the printer 100A, 100B wishes to use the email print function, the user performs operation for storing the email address and the printer ID in the mediation server 10 in advance. The body print setting in the printer table 42 is information designated by users of the printers 100A, 100B. After the email address and the printer ID are stored in the printer table 42, the user of the printer 100A, 100B performs operation of designating either "enabled" or "disabled" as the body print setting.

Figure 2:
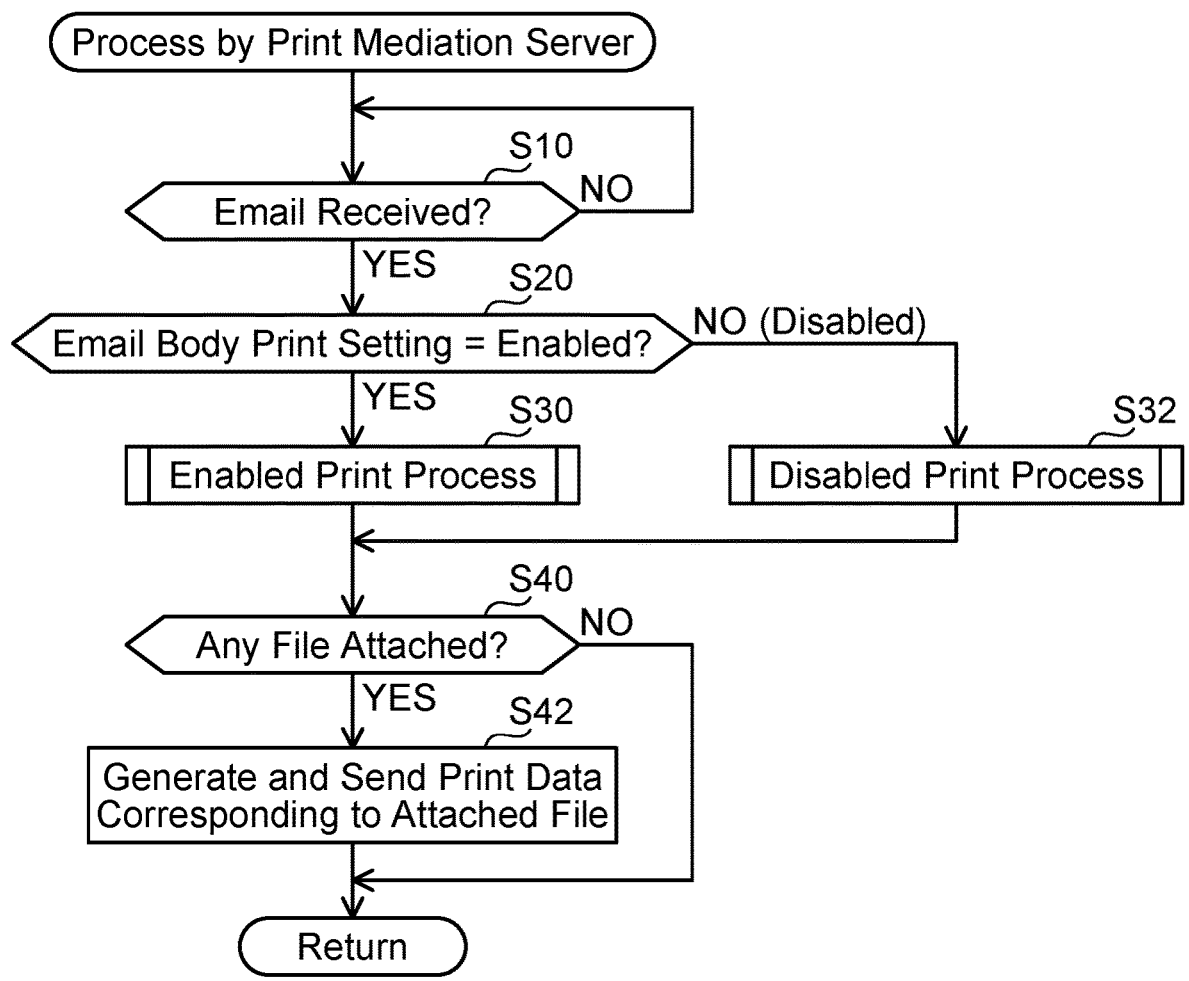
FIG. 2 is a flowchart of processes executed by a print mediation server.

(Processes Executed by Mediation Server 10: FIG. 2)

Next, processes executed by the CPU 32 of the mediation server 10 will be described with reference to FIG. 2. Communication hereinbelow is executed via the communication interface 20 and the Internet 4. As such, the descriptions "via the communication interface 20" and "via the Internet 4" will be omitted hereinbelow.

In S10, the CPU 32 monitors receiving an email from the PC 200. The CPU 32 determines YES to S10 in a case of receiving an email from the PC 200 and proceeds to S20.

In S20, the CPU 32 firstly specifies a recipient address included in the email and specifies body print setting associated with this recipient address from the printer table 42. Then, the CPU 32 determines whether this body print setting indicates "enabled" or "disabled". The CPU 32 proceeds to S30 in a case of determining that it indicates "enabled" (YES to S20) and proceeds to S32 in a case of determining that it indicates "enabled" (NO to S20).

Figure 3:
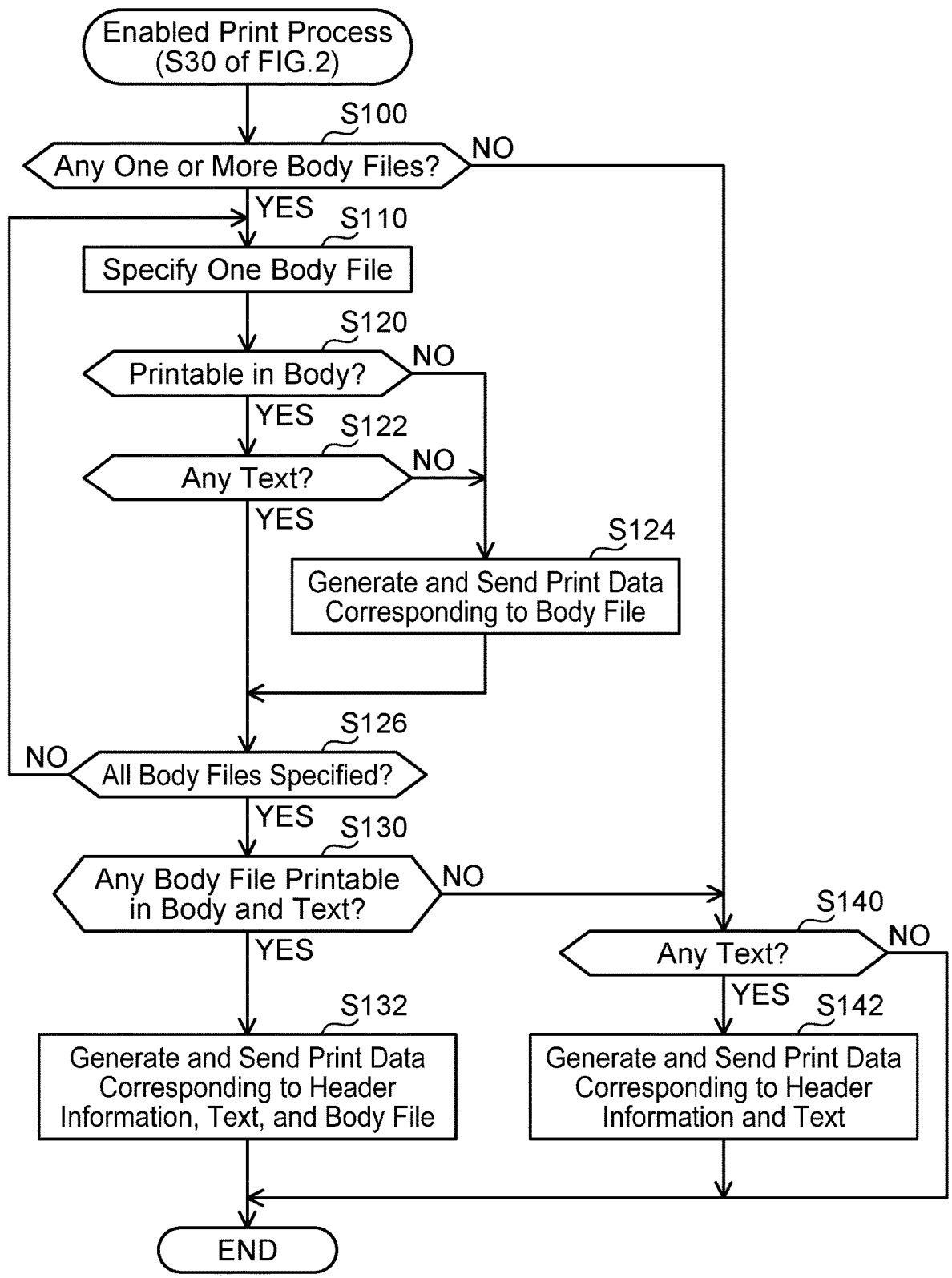
FIG. 3 is a flowchart of an enabled print process.

In S30, the CPU 32 executes an enabled print process (see FIG. 3). The enabled print process is a process for printing an image including a text written in a body part of the email.

Figure 4:
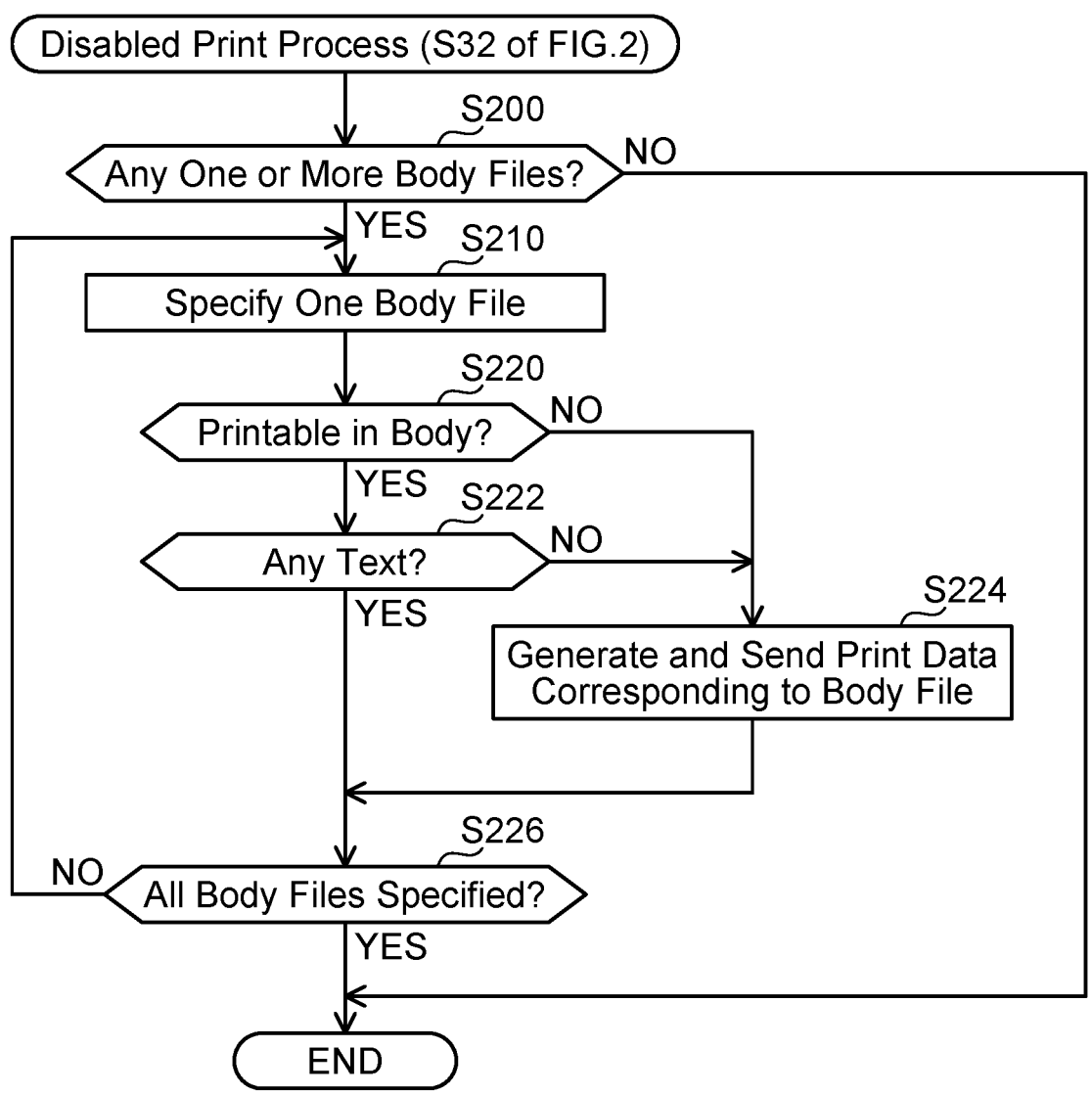
FIG. 4 is a flowchart of a disabled print process.

In S32, the CPU 32 executes a disabled print process (see FIG. 4). The disabled print process is a process for printing an image not including the text written in the body part of the email.

In S40, the CPU 32 determines whether the email includes an attached file. The CPU 32 proceeds to S42 in a case of determining that it includes an attached file (YES to S40), and skips S42 and returns to the process of S10 in a case of determining that it does not include an attached file (NO to S40).

In S42, the CPU 32 generates print data corresponding to the attached file. Specifically, the CPU 32 executes a conversion process on the attached file and generates print data having a data format which a printer (such as 100A) is capable of interpreting. Here, the data format which the printer is capable of interpreting may for example be a well-known data format such as Joint Photographic Experts Group (JPEG), or may be a data format developed by the vendor of the printer. The print data generated hereof does not include information in a header part of the email (such as a subject, a recipient address, a sender address, and date-and-time information) and also does not include information in the body part of the email (such as the text and an image inserted in the body part).

In S42, the CPU 32 further specifies the recipient address (such as aaa@print.com) included in the email and specifies a printer ID (such as P1) associated with the specified email address from the printer table 42 (see FIG. 1). Then, the CPU 32 sends the print data to the printer (such as 100A) identified by the specified printer ID. As a result, the image represented by this print data, that is, the image represented by the attached file is printed by this printer.

In actuality, prior to sending the print data to the printer, the CPU 32 sends a notification to the printer indicating that the print data has been generated and receives a sending request of the print data from the printer, and thereafter sends the print data to the printer. However, in the present embodiment, communication of such notification and sending request is omitted from the drawings. The same applies to processes for sending print data below (such as S124 of FIG. 3). Further, although omitted from the description, in order to send the aforementioned notification from the mediation server 10 on the Internet 4 to the printer to be used, an eXtensible Messaging and Presence Protocol (XMPP) connection must be established in advance between the mediation server 10 and this printer. By using the XMPP connection, the mediation server 10 can send the aforementioned notification to the printer beyond a firewall of a LAN to which the printer belongs.

(Enabled Print Process: FIG. 3)

Next, the enabled print process of S30 of FIG. 2 will be described with reference to FIG. 3. In S100, the CPU 32 determines whether the body part includes one or more body files. In other words, the CPU 32 determines whether one or more images represented by the one or more body files are included in the body part. The CPU 32 proceeds to S110 in a case of determining that the body part includes one or more body files (YES to S100) and proceeds to S140 in a case of determining that the body part does not include any body file (NO to S100).

In S110, the CPU 32 specifies one body file from the one or more body files.

In S120, the CPU 32 determines whether the image represented by the specified body file can be printed within the body. In other words, the CPU 32 determines whether this image can be printed on same print medium as the text included in the body part. Specifically, in a case where the specified body file has a predetermined file format, the CPU 32 determines that the image can be printed within the body (YES to S120) and proceeds to S122. Here, in the present embodiment, the predetermined file format is JPEG and PNG. However, in a variant, the predetermined file format may be another file format (such as GIF, TIFF, and BMP). Hereinbelow, the body file having the predetermined file format will be denoted as "body print-available file". On the other hand, in a case where the specified body file does not have the predetermined file format, the CPU 32 determines that the image cannot be printed within the body (NO to S120) and proceeds to S124. For example, the CPU 32 determines that print within the body is not possible when the specified body file is a PDF. Hereinbelow, the body file not having the predetermined file format will be denoted as "body print-unavailable file".

In S122, the CPU 32 determines whether the body part includes a text. Details of this process of S122 will be described with reference to FIG. 5. An email 300 is written according to Hyper Text Markup Language (HTML), and includes a header part 310, a body part 350, and an attached file 390.

The header part 310 includes the sender address, the recipient address, the date-and-time information, and the subject. The body part 350 includes respective HTML commands, and especially includes the text "I'm sending you the photograph". As such, an image 350A representing the body part 350 (such as an image displayed in a mailer of a sender of this email) includes the text "I'm sending you the photograph". The body part 350 further includes a body file 370. That is, the image 350A representing the body part 350 includes an image 370A represented by the body file 370. In other words, the image 370A is inserted in the body part 350. The attached file 390 represents an image 390A. In a state where the email is displayed on the mailer, information of the header part 310 and the image 350A are displayed and the image 390 is not displayed. The image 390A is displayed when the attached file 390 is opened by the user in the mailer.

In S122, the CPU 32 firstly deletes one start tag "<", an end tag ">" corresponding to this start tag, and a letter string "!DOCTYPE html" between these start tag and end tag from the body part 350. The CPU 32 executes similar process for other sets of start tag and end tag. As a result in the example of FIG. 5, a letter string "I'm sending you the photograph" remains. As above, in a case where one or more letters remain after having executed deletion as above in the body part, the CPU 32 determines that the body part includes text (YES to S122) and proceeds to S126. On the other hand, in a case where no letter remains after having executed the deletion as above in the body part, the CPU 32 determines that the body part does not include the text (NO to S122) and proceeds to S124. As above, the mediation server 10 can suitably determine whether the body part includes text by using the tags.

In S124, the CPU 32 generates print data corresponding to the body file. Specifically, the CPU 32 generates the print data by executing the conversion process on the body file. The print data generated hereof does not include information in the header part nor information in the body part. In S124, the CPU 32 further specifies the printer ID from the recipient address similar to the description of S42 as above, and sends the print data to the printer identified by the specified printer ID. As a result of this, the printer prints an image represented by this print data, that is, the image represented by the body file.

In S126, the CPU 32 determines whether all of the one or more body files included in the body part have been specified in S110. In a case of determining that all of the one or more body files have been specified (YES to S126), the CPU 32 proceeds to S130. On the other hand, in a case of determining that all of the one or more body files have not been specified (NO to S126), the CPU 32 returns to S110 and specifies the body file(s) that have not yet been specified.

In S130, the CPU 32 determines whether there is a body file that can be printed within the body (i.e., "printable file") and the body part includes a text. That is, the CPU 32 determines whether S120 has been determined YES and S122 has been determined YES. In a case where there is one or more printable files and the body part includes the text, the CPU 32 determines YES to S130 and proceeds to S132. On the other hand, in a case where there is no printable file or a case where the body part does not include the text, the CPU 32 determines NO to S130 and proceeds to S140.

In S132, the CPU 32 generates print data corresponding to header information, the text included in the body part, and the one or more printable files. The header information is the sender address and the subject included in the header part. Specifically, the CPU 32 firstly generates print data corresponding to the header information so that the header information will be printed at a top of the print medium. Then, the CPU 32 generates print data corresponding to the text and the one or more printable files. Here, the CPU 32 generates the print data such that the text and one or more images represented by the one or more printable files are printed on the print medium as aforementioned in accordance with an order in which they are written in the body part of the email. For example, in the example of the email 300 of FIG. 5, print data therefor is generated such that the text "I'm sending you the photograph" is printed under the header information and the image 370A is printed under the text. In a case where the respective pieces of information of S132 being print targets do not fit in one sheet of print medium, the CPU 32 generates the print data for printing over two or more print mediums.

In S132, the CPU 32 further specifies the printer ID from the recipient address similar to the description of S42 as above, and sends the print data to the printer identified by the specified printer ID. As a result of this, the printer prints images represented by the print data, that is, the header information, the text, and the one or more images. When S132 is completed, the process of FIG. 3 is terminated.

In S140, the CPU 32 determines whether the body part includes a text, similar to S122. The CPU 32 proceeds to S142 in a case of determining that the body part includes the text (YES to S140), and skips S142 and terminates the process of FIG. 3 in a case of determining that the body part does not include the text (NO to S140).

(Disabled Print Process: FIG. 4)

Next, the disabled print process of S32 of FIG. 2 will be described with reference to FIG. 4. In S200, the CPU 32 determines whether the body part includes one or more body files. The CPU 32 proceeds to S210 in a case of determining that the body part includes one or more body files (YES to S200), and terminates the process of FIG. 4 without executing subsequent processes in a case of determining that the body part does not include any body file (NO to S200).

S210 to S226 are to the same as S110 to S126 of FIG. 3. When YES is determined in S226, the process of FIG. 4 is terminated.

(Specific Print Results: FIGS. 6 and 7)

Figure 5:
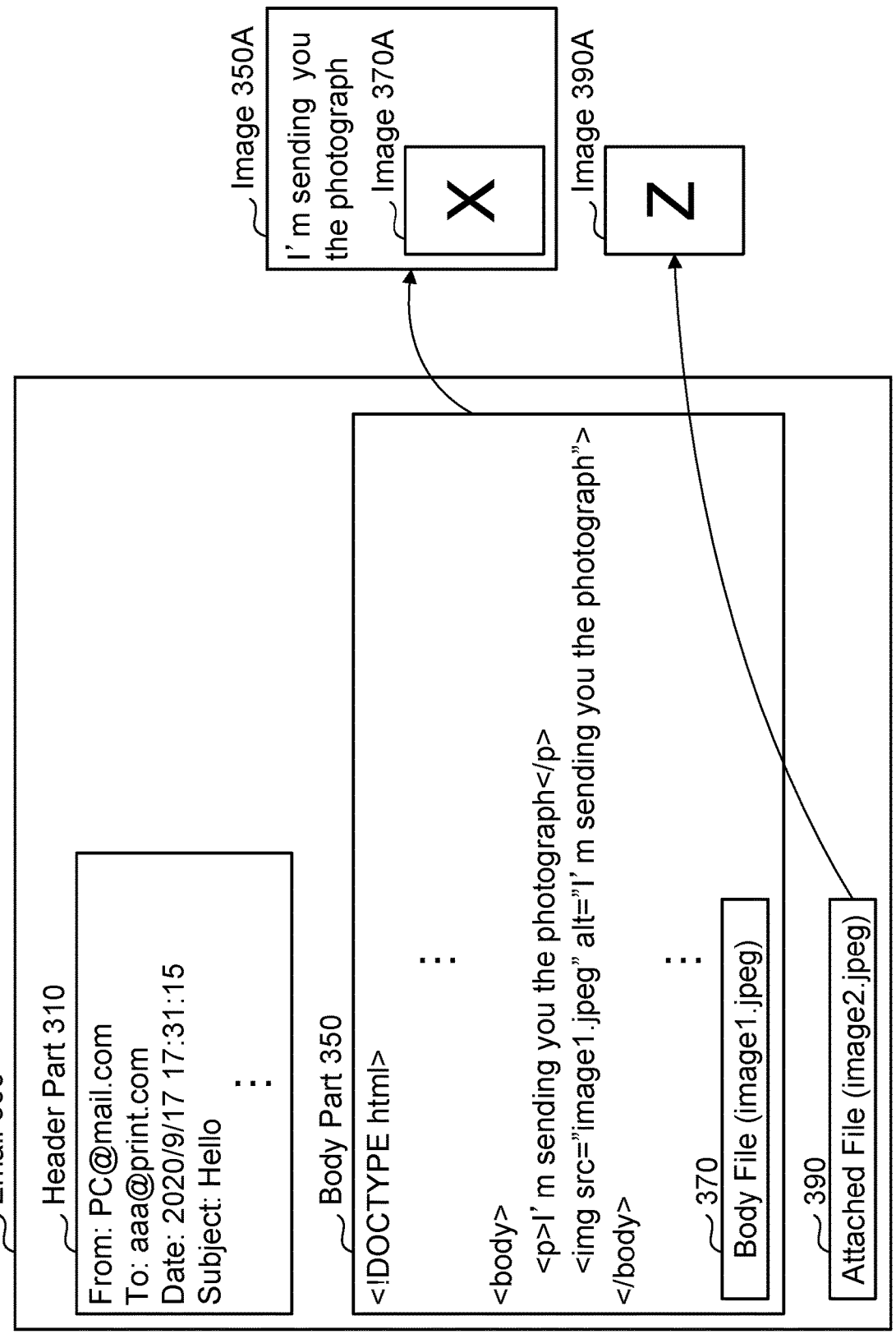
FIG. 5 shows an example of an email.

Next, specific print results realized by the processes of FIGS. 3 to 5 will be described with reference to FIGS. 6 to 8. Firstly, the print results of cases in which the body print setting is "enabled" will be described with reference to FIGS. 6 and 7.

(Case where body print setting is "enabled" and only one body file is included: FIG. 6)

In a case where the file format of the body file is JPEG (YES to S100, YES to S120 of FIG. 3) and the body part includes the text (YES to S122, YES to S130), the mediation server 10 generates print data corresponding to the header information, the text, and a JPEG image "X", and sends this print data to one of the printers (such as 100A) (S132). Due to this, the printer prints the header information, the text, and the JPEG image "X" on a same print medium P1.

When the user writes a text in the body part, he/she normally intends the header information and the text to be printed altogether rather than printing only the text. Further, when the user inserts a printable file (i.e., JPEG image) in addition to the text, he/she normally intends the header information, the text, and the JPEG image to be printed altogether. In the above case of printing on the print medium P1, such intention of the user can be realized.

Further, in a case where the email includes an attached file (YES to S40 of FIG. 2), the mediation server 10 generates print data corresponding to an attached file image "Z" thereof and sends this print data to the printer (S42). Due to this, the printer prints the attached file image "Z" on a print medium P2 different from the print medium P1. The feature that the attached file image "Z" is printed applies similarly to other cases below (see P4, P7, and P9).

When the user includes the attached file in the email, he/she normally intends the attached file image to be printed separately from the body part. In the above case of printing on the print medium P2, such intention of the user can be realized.

In a case where the file format of the body file is JPEG (YES to S100, YES to S120 of FIG. 3) and the body part does not include the text (NO to S122), the mediation server 10 generates print data corresponding only to a JPEG image "X" and sends this print data to the printer (S124). Due to this, the printer prints only the JPEG image "X" on a print medium P3. Since the body part does not include a text, the print data corresponding to the header information is not generated (NO to S140), and the header information is therefore not printed.

When the user does not write a text in the body part and inserts the printable file (i.e., JPEG image) in the body part, he/she normally intends only the JPEG image to be printed as in the printing of the attached file included in the email. In the above case of printing on the print medium P3, such intention of the user can be realized.

In a case where the file format of the body file is PDF (YES to S100, NO to S120 of FIG. 3) and the body part includes a text, the mediation server 10 generates print data corresponding only to a PDF image "Y" and sends this print data to the printer (S124). Due to this, the printer prints only the PDF image "Y" on a print medium P6. Since the body part includes the text (YES to S140), the mediation server 10 further generates print data corresponding to the header information and the text, and sends this print data to the printer (S142). Due to this, the printer prints the header information and the text on a print medium P5 different from the print medium P6.

Even when a non-printable file (i.e., PDF image) is inserted in the body part, the PDF image cannot be printed on a same print medium as the text. As such, only the PDF image is printed on the print medium P6. Further, when the user writes a text in the body part, he/she normally intends the header information and the text to be printed altogether. In the above case of printing on the print medium P5, such intention of the user can be realized.

In a case where the file format of the body file is PDF (YES to S100, NO to S120 of FIG. 3) and the body part does not include a text, the mediation server 10 generates print data corresponding only to the PDF image "Y" and sends this print data to the printer (S124). Due to this, the printer prints only the PDF image "Y" on a print medium P8. Since the body part does not include a text (NO to S140), print data corresponding to the header information is not generated (NO to S140) and the header information is therefore not printed.

(Case where body print setting is "enabled" and only two body files are included: FIG. 7)

Next, the print result of a case where there are two body files will be described with reference to FIG. 7. In a case where the file format of both of the two body files is JPEG (YES to S100, YES to S120 of FIG. 3) and the body part includes the text (YES to S122, YES to S130), the mediation server 10 generates print data corresponding to the header information, the text, and two JPEG images "X1", "X2", and sends the print data to the printer (S132). Due to this, the printer prints the header information, the text, and the two JPEG images "X1", "X2" on a same print medium P11.

Further, in a case where the email includes the attached file (YES to S40 of FIG. 2), the mediation server 10 generates the print data corresponding to the attached file image "Z" thereof and sends this print data to the printer (S42). Due to this, the printer prints the attached file image "Z" on a print medium P12 different from the print medium P11. The feature that the attached file image "Z" is printed applies similarly to other cases below (see P15, P23, and P26).

In a case where the file format of both of the two body files is JPEG (YES to S100, YES to S120 of FIG. 3) and the body part does not include a text (NO to S122), the mediation server 10 firstly generates print data corresponding only to the JPEG image "X1" and sends this print data to the printer (S124). Due to this, the printer prints only the JPEG image "X1" on a print medium P13. Further, the mediation server 10 then generates print data corresponding only to the JPEG image "X2" and sends this print data to the printer (S124). Due to this, the printer prints only the JPEG image "X2" on a print medium P14 different from the print medium P13. Since the body part does not include a text, print data corresponding to the header information is not generated (NO to S140) and the header information is therefore not printed.

In a case where the file format of one of the two body files is JPEG (YES to S100, YES to S120 of FIG. 3) and the body part includes a text (YES to S122, YES to S130), the mediation server 10 generates print data corresponding to the header information, the text, and the JPEG image "X" and sends this print data to the printer (S132). Due to this, the printer prints the header information, the text, and the JPEG image "X" on a same print medium P21. Further, in a case where the file format of another of the two body files is PDF (YES to S100, NO to S120 of FIG. 3) and the body part includes a text, the mediation server 10 generates print data corresponding only to the PDF image "Y" and sends this print data to the printer (S124). Due to this, the printer prints only the PDF image "Y" on a print medium P22 different from the print medium P21.

In a case where the file format of one of the two body files is JPEG (YES to S100, YES to S120 of FIG. 3) and the body part does not include a text (NO to S122), the mediation server 10 generates print data corresponding only to the JPEG image "X" and sends this print data to the printer (S132). Due to this, the printer prints only the JPEG image "X" on a print medium P24. Further, in a case where the file format of the other of the two body files is PDF (YES to S100, NO to S120 of FIG. 3) and the body part does not include a text, the mediation server 10 generates print data corresponding only to the PDF image "Y" and sends this print data to the printer (S124). Due to this, the printer prints only the PDF image "Y" on a print medium P25 different from the print medium P24. Since the body part does not include a text (NO to S140), the print data corresponding to the header information is not generated (NO to S140), and the header information is therefore not printed.

(Case where body print setting is "disabled": FIG. 8)

Next, the print result of a case where the body print setting is "disabled" will be described with reference to FIG. 8. In a case where the file format of the body file is JPEG (YES to S200, YES to S220 of FIG. 4) and the body part includes a text (YES to S222), the mediation server 10 does not generate print data corresponding to the header information, the text, and the JPEG image "X" is not generated, and thus does not send such print data to the printer.

When the user sets the body print setting to "disabled", he/she intends that the body part is not to be printed. In the above case that does not generate or send the print data to the printer, such intention of the user can be realized.

Further, in a case where the email includes the attached file (YES to S40 of FIG. 2), the mediation server 10 generates print data corresponding to the attached file image "Z" and sends this print data to the printer (S42). Due to this, the printer prints the attached file image "Z" on a print medium P31. The feature that the attached file image "Z" is printed applies similarly to other cases below (see P33, P35, and P37).

In a case where the file format of the body file is JPEG (YES to S200, YES to S220 of FIG. 4) and the body part does not include the text (NO to S222), the mediation server 10 generates print data corresponding only to the JPEG image "X" and sends this print data to the printer (S224). Due to this, the printer prints only the JPEG image "X" on a print medium P32.

In both cases of the print medium P3 of FIG. 6 and the print medium P32 of FIG. 8, only the JPEG image "X" is printed. That is, in the case where the body part does not include a text, generation and sending of the print data representing only the JPEG image are executed irrespective of whether the body print setting indicates "enabled" or "disabled". Irrespective of whether the body print setting is set to "enabled" or "disabled", in the case where the text is not written in the body part and the printable file (i.e., JPEG image) is inserted in the body part, the user normally intends the printable file to be treated similar to the attached file. That is, the user intends to print only the JPEG image. In the above cases of printing on the print mediums P3, P32, such intention of the user can be realized.

In a case where the file format of the body file is PDF (YES to S200, NO to S220 of FIG. 4) and the body part includes the text, the mediation server 10 generates the print data corresponding only to the PDF image "Y" and sends this print data to the printer (S224). Due to this, the printer prints only the PDF image "Y" on a print medium P34.

In a case where the user inserted the non-printable file (i.e., PDF image) in the body part although the body print setting is set to "disabled", he/she normally intends the non-printable file to be treated similar to the attached file. That is, the user intends to print only the PDF image. In the above case of printing on the print medium P34, such intention of the user can be realized.

In a case where the file format of the body file is PDF (YES to S200, NO to S220 of FIG. 4) and the body part does not include a text, the mediation server 10 generates the print data corresponding only to the PDF image "Y" and sends this print data to the printer (S224). Due to this, the printer prints only the PDF image "Y" on a print medium P36.

(Effects of Present Embodiment)

According to the present embodiment, in the case where the body part in which the JPEG image "X" is inserted includes the text, the mediation server 10 can cause the printer to print the image including the header information, the text, and the JPEG image "X" (see print medium P1 of FIG. 6). On the other hand, in the case where the body part in which the JPEG image "X" is inserted does not include the text, the mediation server 10 can cause the printer to print the image including only the JPEG image "X" (see print medium P3). As above, the mediation server 10 can switch between causing the printer to print the image including the header information, the text, and the JPEG image "X" and causing the printer to print the image including only the JPEG image "X" depending on whether the body part in which the JPEG image "X" is inserted includes a text. As such, the mediation server 10 can suitably cause the printer to execute print related to the email including the body part in which the JPEG image "X" is inserted.

(Corresponding Relationship)

The mediation server 10 and the printer (such as 100A) are respectively an example of "control device" and "print executing unit". The print mediums P1, P3 of FIG. 6 are respectively an example of "first print medium" and "second print medium". The print mediums P6, P5 are respectively an example of "third print medium" and "fourth print medium". The print mediums P2, P4 are examples of "fifth print medium". The body print setting, "enabled", and "disabled" are respectively an example of "setting information", "first value", and "second value". JPEG and PNG are examples of "predetermined file format".

S10, S42 of FIG. 2 are respectively an example of "receive an email" and "supply fifth print data". S132, S124 of FIG. 3 are respectively an example of "supply first print data" and "supply second print data". S224 of FIG. 4 is also an example of "supply second print data". S124, S224 of FIG. 3 are examples of "supply third print data". S142 is also an example of "supply third print data". S122, S140, and S222 of FIG. 4 are examples of "determine that the body part includes the text (and determine the body part does not include the text)".

(Variant 1) The mediation server 10 may not be provided. For example, the printer 100 may receive the email from the PC 200 without intervention of the mediation server 10. In this case, a controller (i.e., CPU) of the printer 10 executes the processes of FIGS. 2 to 4. Here, when the controller generates the print data in S42 of FIG. 2 and S124 of FIG. 3, it supplies the print data to a print engine in the printer 100. In this variant, the controller and the print engine of the printer are respectively an example of "control device" and "print executing unit".

(Variant 2) The mediation server 10 may not store the body print setting. In this case, S20, S32 of FIG. 2 and FIG. 4 may be omitted. In the present variant, process corresponding to "a case where the setting information indicates the second value" may be omitted.

(Variant 3) The email may be configured capable of inserting only a body printable file in a body part and incapable of inserting a body print-unavailable file in the body part. In this case, S120 of FIG. 3 and S220 may be omitted. In the present variant, "supply third print data" may be omitted.

(Variant 4) The email may be configured incapable of including the attached file when the body file is inserted in the body part. In the present variant, "supply fifth print data" may be omitted.

(Variant 5) The mediation server 10 may determine whether the body part includes a text using a method different from that of the above embodiment. For example, the email may be written according to a text format instead of being written according to HTML. In this case, the mediation server 10 may determine that the body part includes a text when the body part includes a letter string and determine that the body part does not include a text when the body part does not include a letter string.

(Variant 6) The header information may include one or both of the recipient address and the date-and-time information instead of or in addition to the sender address and the subject. Further, in another variant, the header information may include information (such as information indicating a data format of the email) different from the sender address, the recipient address, the subject, and the date-and-time information.

(Variant 7) In the case of NO to S140 of FIG. 3, the mediation server 10 may generate print data corresponding only to the header information and send this print data to the printer.

(Variant 8) The mediation server 10 may not have the XMPP connection established with the printer to be used. In this case, for example, when the email is received and the print data is generated, the mediation server 10 may send a PIN to the PC being a sender of the email. The mediation server stores the print data and the PIN in association with each other. After having seen the PIN displayed on the PC, the user inputs this PIN to the printer. In this case, the printer sends a request including the PIN to the mediation server 10. When the request including the PIN is received from the printer, the mediation server 10 sends the print data associated with this PIN to the printer. In another variant, when the email is received and the print data is generated, the mediation server 10 stores the print data and the sender address in association with each other. The user selects the email address stored in the printer and matching the sender address on a display unit of the printer. In this case, the printer sends a request including this email address to the mediation server 10. When the request including the email address is received from the printer, the mediation server 10 sends the print data associated with this email address to the printer.

(Variant 9) In the above embodiment, the processes of FIGS. 2 to 4 are realized by the CPU 32 of the mediation server 10 executing the program 40 (i.e., software). Instead of this, at least one of the processes may be realized by hardware such as a logic circuit.

What is claimed is:

1. A control device configured to cause a print executing unit to print, the control device comprising:
a controller,
wherein the controller is configured to:
receive an email including a header part and a body part, wherein a first file image represented by a first file is inserted in the body part;
in a case where the body part includes a text different from the first file image, supply first print data for printing a first print image on a first print medium to the print executing unit, wherein the first print image includes the text, the first file image, and header information which is at least a part of information included in the header part; and
in a case where the body part does not include the text different from the first file image, supply second print data for printing a second print image on a second print medium to the print executing unit, wherein the second print image includes the first file image but does not include the header information.

2. The control device as in claim 1, further comprising:
a memory configured to store setting information, wherein the setting information is designated by a user and indicates either a first value or a second value,
wherein in a case where the setting information indicates the first value and the body part includes the text, the controller is configured to supply the first print data to the print executing unit, and
in a case where the setting information indicates the second value, the controller is configured not to supply the first print data to the print executing unit.

3. The control device as in claim 2, wherein
in the case where the body part does not include the text, the controller is configured to supply the second print data to the print executing unit irrespective of whether the setting information indicates the first value or the second value.

4. The control device as in claim 1, wherein
the controller is further configured to:
in a case where the first file does not have a predetermined file format, supply third print data for printing a third print image on a third print medium to the print executing unit, wherein the third print image includes the first file image but does not include the header information,
wherein in a case where the first file has the predetermined file format and the body part includes the text, the controller is configured to supply the first print data to the print executing unit.

5. The control device as in claim 4, wherein
in a case where the first file does not have the predetermined file format and the body part includes the text, the controller is configured to supply the third print data and fourth print data for printing a fourth print image on a fourth print medium different from the third print medium to the print executing unit, and the fourth image includes the header information and the text.

6. The control device as in claim 5, further comprising:
a memory configured to store setting information, wherein the setting information is designated by a user and indicates either a first value or a second value,
wherein in a case where the setting information indicates the first value, the first file does not have the predetermined file format, and the body part includes the text, the controller is configured to supply the third print data and the fourth print data to the print executing unit, and
in a case where the setting information indicates the second value, the first file does not have the predetermined file format, and the body part includes the text, the controller is configured to supply the third print data to the print executing unit, without supplying the fourth print data to the print executing unit.

7. The control device as in claim 1, wherein
the controller is further configured to:
in a case where the body part includes the text and the email includes a second file as an attached file, supply fifth print data for printing a fifth print image on a fifth print medium different from the first print medium to the print executing unit, wherein a second file image represented by the second file is not inserted in the body part, and the fifth print image includes the second file image but does not include the header information,
wherein in a case where the body part does not include the text and the email includes the second file as an attached file, the controller is configured to supply the fifth print data for printing the fifth print image on the fifth print medium different from the second print medium to the print executing unit.

8. The control device as in claim 1, wherein
the email is written according to Hyper Text Markup Language (HTML), and
the controller is further configured to:
in a case where one or more letters remain after a start tag, an end tag, and a letter string between the start tag and the end tag have been deleted from the body part, determine that the body part includes the text, and
in a case where no letter remains after the start tag, the end tag, and the letter string between the start tag and the end tag have been deleted from the body part, determine the body part does not include the text.

9. The control device as in claim 1, wherein
the header information includes at least one of a sender address, a recipient address, a subject, and date-and-time information.

10. The control device as in claim 1, wherein
the control device is a server configured separately from the print executing unit.

11. A non-transitory computer-readable recording medium storing computer readable instructions for a control device configured to cause a print executing unit to print,
wherein the computer readable instructions, when executed by a processor of the control device, cause the control device to:
receive an email including a header part and a body part, wherein a first file image represented by a first file is inserted in the body part;
in a case where the body part includes a text different from the first file image, supply first print data for printing a first print image on a first print medium to the print executing unit, wherein the first print image includes the text, the first file image, and header information which is at least a part of information included in the header part; and in a case where the body part does not include the text different from the first file image, supply second print data for printing a second print image on a second print medium to the print executing unit, wherein the second print image includes the first file image but does not include the header information.

* * * * *